Apr. 24, 1923.
W. K. AUCHINCLOSS
TANK CAR
Filed Oct. 16, 1920
1,452,487
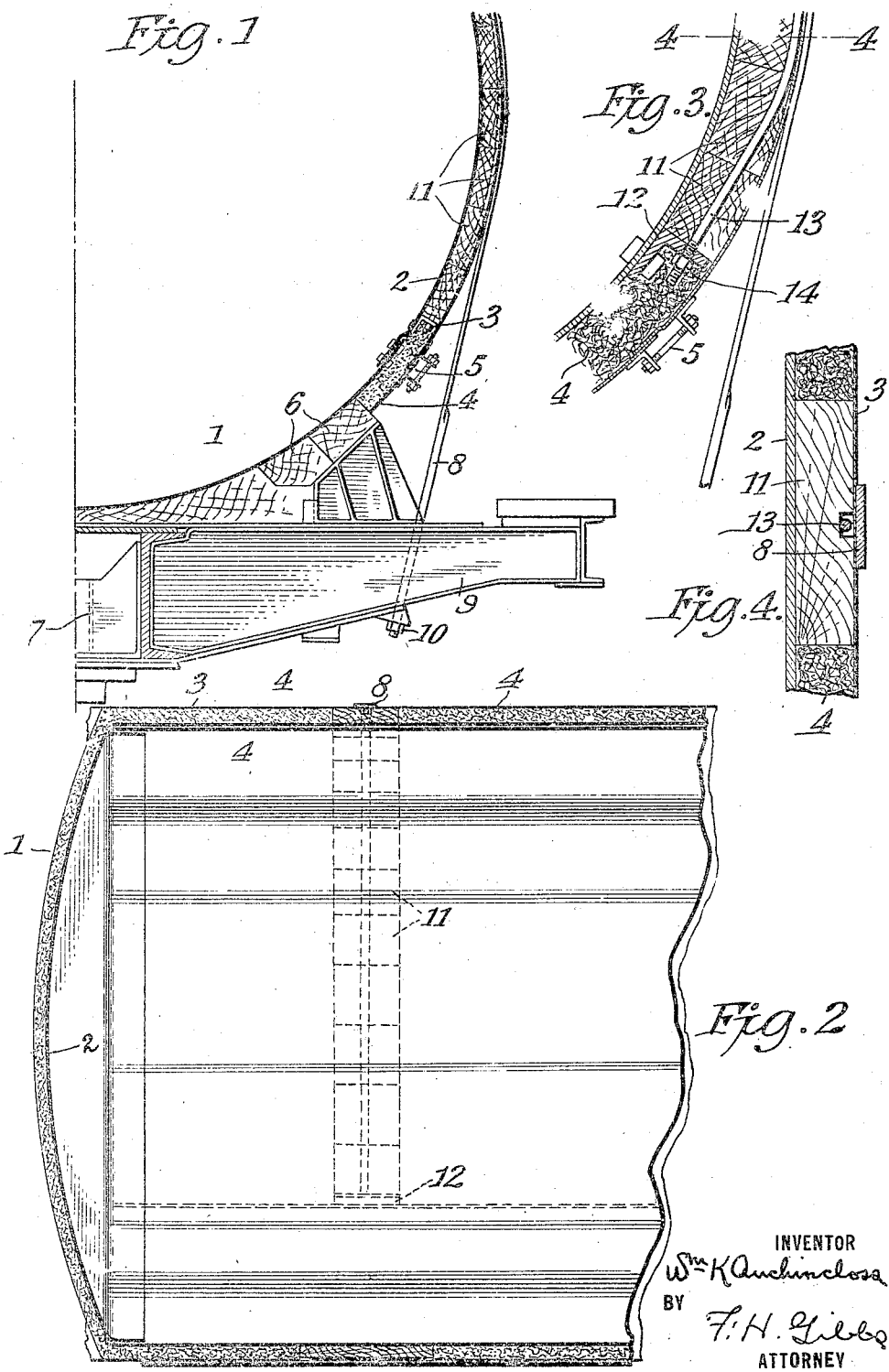

Patented Apr. 24, 1923.

1,452,487

UNITED STATES PATENT OFFICE.

WILLIAM K. AUCHINCLOSS, OF NEW YORK, N. Y., ASSIGNOR TO AMERICAN CAR AND FOUNDRY COMPANY, OF ST. LOUIS, MISSOURI, A CORPORATION OF NEW JERSEY.

TANK CAR.

Application filed October 16, 1920. Serial No. 417,353.

*To all whom it may concern:*

Be it known that I, WILLIAM K. AUCHINCLOSS, residing at New York, in the county and State of New York, and being a citizen of the United States, have invented certain new and useful Improvements in a Tank Car, of which the following is a full, clear, and exact description, such as will enable others skilled in the art to which it appertains to make and use the same, reference being had to the accompanying drawings, which illustrate the preferred form of the invention, though it is to be understood that the invention is not limited to the exact details of construction shown and described, as it is obvious that various modifications thereof within the scope of the claims will occur to persons skilled in the art.

In said drawings:

Figure 1 is a fragmentary transverse section of an insulated tank car showing my improvement applied thereto;

Figure 2 is a longitudinal section of an end portion of an insulated car tank showing my improvement applied thereto;

Figure 3 is a sectional view through a portion of my improvement showing the securing means used in connection therewith; and Figure 4 is an enlarged view of a portion of Fig. 2 showing the respective positions of the retaining straps and insulating blocks of my invention.

Insulated car tanks as previously constructed have been provided with a layer of a light heat insulating material placed between the inner and outer tanks and it has been found in practice that this light material does not possess sufficient resistance to prevent deformation of the lighter outer tank by the pressure exerted thereon in service by the tank bands that secure the tank to the car frame. It is therefore, the object of my invention to provide a means whereby the tank bands will be prevented from deforming the outer tank or protective sheathing and to this end it comprises blocks of a suitable heat insulating material secured to the inner tank and serving to support the outer tank where subjected to the pressure to the tank bands.

In the drawing, 1 designates an insulated car tank comprising an inner tank 2 and an outer or protecting tank or sheathing 3 of lighter plates separated from the inner tank 2 by a layer of suitable heat insulating material 4, as hair felt or similar material, the sections of the outer tank being provided with slip joints 5 that permit of the outer tank being drawn tightly against the insulation.

As shown in Fig. 1, the inner tank 1 rests upon the saddle blocks 6 carried by the car underframe 7 and is secured in position by the tank bands 8 which extend over the outer tank and through openings in the bolster members 9. Nuts 10 secure the tank bands 8 in position.

The bottom sheets of the outer tank extend beneath the inner tank to the corresponding slip joints 5 (not shown) on the other side except at the bolsters, where they are cut away so as to permit the inner tank to rest upon the saddle blocks, and at the tank anchoring means where the outer tank sheets are also secured to the tank anchoring means.

The insulation beneath those portions of the outer tank that are subjected to the pressure of the tank bands 8 is replaced by an insulation that will retain its shape when subjected to the pressure of the band as the blocks 11 of wood or other suitable heat insulating material. The blocks 11 are cut so that when fitted together they will form a portion of a ring that will engage the outer surface of the inner tank 2 and extend between the angle bar members 12, only one of which is shown in the drawings, riveted or otherwise secured to the outer surface of the inner tank 2. The blocks 11 have a slot in their outer surfaces and are held in place by a tie rod 13 which lies in the slot and has its ends extending through openings in the angle bars 12. Nuts 14 screwed on the ends of the tie rod 13 hold the tie rod in position. To position the nuts 14 behind the surface plane of the blocks, the slots in the end blocks deepen gradually as they approach the angle bar members.

As shown in the drawings, but a single tie rod 13 placed in a slot directly under the band 8 is used but a plurality of tie rods 13 placed in slots on each side of the band 8 may be used.

What I claim is:

1. In a tank car, a tank, a sheathing for said tank, yielding and unyielding insulation between said tank and sheathing and bands securing said tank and sheathing to the car frame, said unyielding insulation preventing deformation of said sheathing by said bands.

2. In an insulated tank car, inner and outer tanks, bands securing said tank to the car frame and insulation between said tanks adapted to prevent deformation of said outer tank by said bands.

3. In an insulated tank car, inner and outer tanks, bands securing said tanks to the car frame, insulation between said tanks and insulating blocks separating said tanks and preventing deformation of said outer tank by said bands.

4. In an insulated tank car, inner and outer tanks, bands securing said tanks to the car frame, insulating blocks between said tanks and means holding said blocks in position against one of the tanks, said blocks being placed so as to take the pressure of said bands and prevent deformation of said outer tank.

5. In an insulated tank car, inner and outer tanks, bands securing said tanks to the car frame, angle bar members secured to said inner tank, insulating blocks between said tanks confined between said angle bar members and means connecting said angle bar members and holding said blocks to said tank, said blocks being positioned to take the pressure of said bands.

6. In a tank car, a tank, angles secured to said tank, grooved insulating blocks carried by said tank and a rod fitting the groove in said blocks and having its ends secured to said angles to secure said blocks to said tank.

7. In a tank car, an underframe, a tank carried by said underframe, a sheathing for said tank, grooved insulating blocks between said tank and sheathing, a rod fitting the groove in said blocks and securing said blocks to the tank and a band securing said tank and sheathing to said underframe, said blocks transmitting the pressure from said band to said tank.

In witness whereof I have hereunto set my hand in the presence of two witnesses.

WILLIAM K. AUCHINCLOSS.

Witnesses:
JOSEPHINE MITCHELL,
R. W. SMITH.